UNITED STATES PATENT OFFICE.

CHARLES E. SWETT, OF BROOKLINE, MASSACHUSETTS, ASSIGNOR TO ARTHUR D. LITTLE, INCORPORATED, OF CAMBRIDGE, MASSACHUSETTS, A CORPORATION OF MASSACHUSETTS.

COMPOSITE MICA BODY AND METHOD OF MAKING SAME.

1,320,509.  Specification of Letters Patent.  Patented Nov. 4, 1919.

No Drawing.   Application filed May 2, 1919.  Serial No. 294,194.

*To all whom it may concern:*

Be it known that I, CHARLES E. SWETT, a citizen of the United States, residing at Brookline, in the county of Suffolk and State of Massachusetts, have invented certain new and useful Improvements in Composite Mica Bodies and Methods of Making Same, of which the following is a specification.

This invention relates to the production of composite or built-up mica sheets or bodies from mica particles or fragments. Such bodies are particularly useful for insulating purposes.

Sheets of insulating mica have been heretofore made from mica fragments by cementing them together with shellac or other resinous media. Such composite sheets serve certain useful purposes, but their field of employment is limited to such conditions as do not require exposure to heat high enough to melt or decompose the cementing material.

It has also been proposed to produce composite mica bodies by uniting the mica fragments by means of inorganic binding agents having melting-points so high as to withstand all temperatures to which the insulation may be subjected in use. The chief objection to this method is that it introduces manufacturing difficulties and consequent increase in cost of production, so that the use of the product is limited.

I have discovered that by employing certain glass-like binding materials of relatively low melting-points and properly proceeding, a composite mica sheet may be produced which will withstand temperatures much higher than those of the melting-points of the binding-materials used without failing in insulating properties, and yet which may be simply and quite inexpensively produced.

The particular binding-material I employ is lead borate having a melting-point not higher than 400° C., and I have obtained very good results with one whose melting-point is about 365° C.

The preferred manner of building up the bodies, assuming for the purpose of illustration that a sheet is being formed, is as follows:

On a suitable support is laid a layer of the mica fragments; over this layer is sifted or sprinkled or otherwise distributed dry lead borate of the character described. Another course of mica fragments is then laid on top of the binder layer, followed by another portion of the binder, and so on alternately until an article of the desired thickness has been produced. Thereupon the whole structure is subjected to mechanical pressure and sufficient heat, say 365°–370° C., to cause the lead borate to fuse and engage the fragments of mica. Upon cooling, a sheet results which is equal from the standpoint of utility to a sheet of natural mica and which will remain intact under substantially all temperatures below that at which mica itself melts.

This virtue is attributable to two factors: First, the viscosity of the lead borate when it is fused is so great that the fragments of mica remain cemented even though the borate be in a fluid state under considerably elevated temperature; and second, if a temperature above the melting-point of the borate be long continued, there appears to be a surface attack by the borate on the constituents of the mica which tends automatically to raise the melting-point of the binder. The practical result of such a condition is that by continued heating at a relatively high temperature, such as might be encountered, for instance, when the article is used for insulation for certain purposes, or by continuing the heating step of the cementing process for a little time beyond what is required for fusing the binder, the mica article becomes capable of remaining in its integral cemented state over any range of temperature below the actual melting-point of the mica.

I have found that it is best to apply the lead borate sparingly but evenly. It is not desirable to secure uniform attachment of the mica fragments by a homogeneous or solid layer of the fused lead borate, but it is preferable that the attachment be somewhat discontinuous or at intermittent points. Homogeneous layers of the fused borate are not fatal to a good cemented sheet, but a more flexible finished sheet results if the points of attachment are discontinuous, and such a sheet will not fracture under heat as would, for example, a glass plate. The limit of divisibility of mica is great. A sheet formed in the manner described above will always present a condition of residual divisibility notwithstanding the fact that mica surface is bound to mica surface by the vitreous cement described. Hence the article possesses a certain amount of pliability and an interruption of continuity which prevents a fracture in the cement from propagating in more than one dimension.

With perhaps less advantage, I may apply, in carrying out the method, materials capable of forming lead borate between the plies of mica, and then heating and subjecting to pressure as before. For example, a solution containing boric acid and lead nitrate in water may be applied, followed by drying, then by pressure and heating to fuse the lead borate produced. Or, according to another possible method, powdered boric acid or boron trioxid is mixed with litharge or the like and the mixture applied in the manner described for lead borate, so that when the article is heated to the necessary fusing temperature, lead borate is produced. Lead borate of suitable low melting-point will thus be produced if the specified ingredients are used in the proportion of two molecular parts of the boron trioxid to three of the lead oxid.

I claim:

1. The method of making articles from mica fragments which comprises distributing between successive layers of fragments a fusible vitreous binder, and subjecting the laminal body to mechanical pressure and sufficient heat to fuse the binder, said binder being so applied that after heating said fragments will be united at intermittent points of attachment.

2. The method of making articles from mica fragments which comprises distributing between successive layers of fragments lead borate, and subjecting the laminal body to mechanical pressure and sufficient heat to fuse the lead borate, said borate being so applied that after heating said fragments will be united at intermittent points of attachment.

3. The method of making articles from mica fragments which comprises distributing between successive layers of fragments lead borate fusible below 400° C., and subjecting the laminal body to mechanical pressure and sufficient heat to fuse the lead borate, said borate being so applied that after heating said fragments will be united at intermittent points of attachment.

4. A composite mica article composed of mica fragments bonded together in layers with a vitreous binder fusible below 400° C.

5. A composite mica article composed of mica fragments bonded together in layers with a fusible vitreous binder at intermittent points of attachment.

6. A composite mica article composed of mica fragments bonded together in layers with lead borate fusible below 400° C., said layers of fragments being united at intermittent points of attachment.

7. A composite mica article composed of mica fragments bonded together with lead borate fusible below 400° C.

In testimony whereof, I affix my signature.

CHARLES E. SWETT.